ABSTRACT OF THE DISCLOSURE

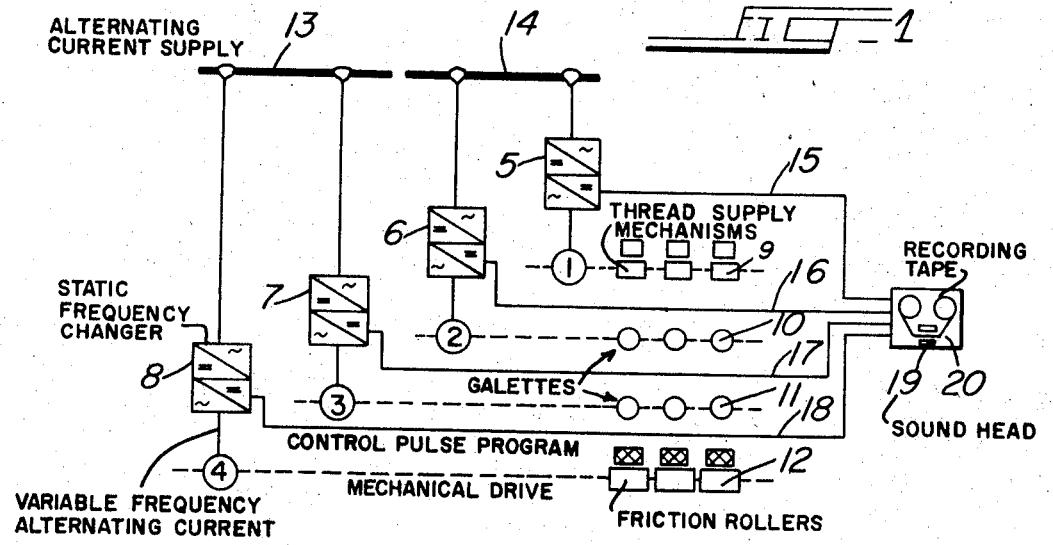
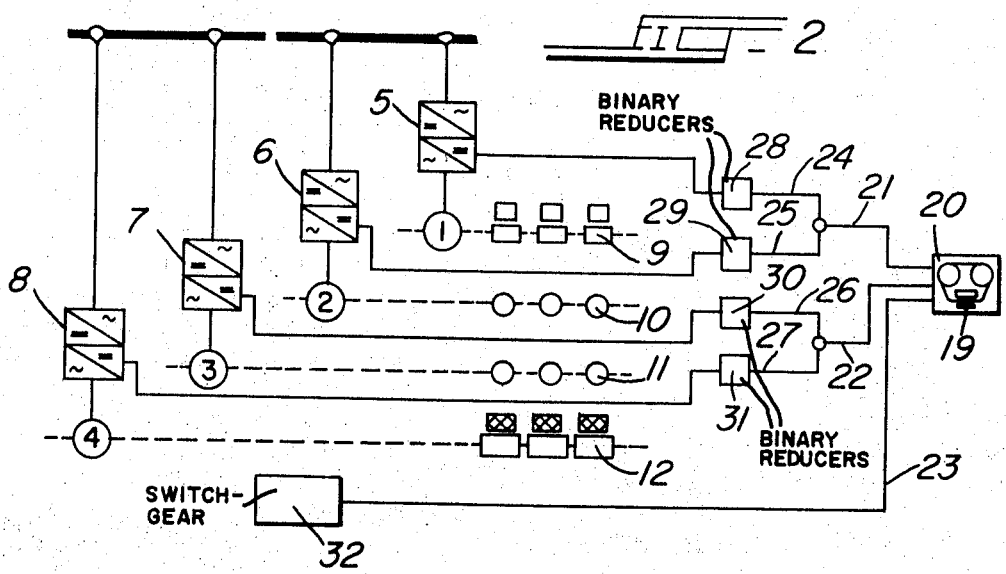
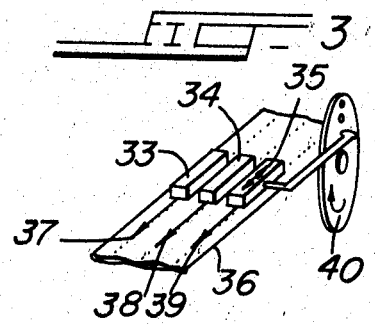
INVENTORS.
HEINZ SCHIPPERS
HANS LOHEST 3,534,240
**APPARATUS FOR SYNCHRONIZING THE TURN-
ING SPEEDS OF ALTERNATING CURRENT
MOTORS**
Heinz Schippers and Hans Lohest, Remscheid-Lennep,
Germany, assignors to Barmag Barmer Maschinen-
fabrik AG., Wuppertal, Germany
Filed Dec. 20, 1966, Ser. No. 603,315
Claims priority, application Germany, Dec. 22, 1965,
B 85,090
Int. Cl. H02p 7/42
U.S. Cl. 368—230                                        6 Claims

The invention described herein consists of apparatus for synchronizing the turning speed of alternating current motors or motor groups. Specifically, control impulse programs are stored on adjacent channels or tracks of an endless magnetic recording tape or similar storage means. The control impulse programs, which are utilized to control the turning speed of a plurality of alternating current motors, are read from the magnetic recording tape and communicated to static frequency changers. Under the control of the impulse programs, the static frequency changers provide power to the alternating current motors at frequencies corresponding to the desired motor turning speeds. This invention will be particularly useful in those situations where accurate control of motor turning speed is essential and where the maintenance of synchronism between motor turning speeds is mandatory.

---

The present invention relates in general to the control of electrical motors, and has more particular reference to a method and apparatus for motor speed regulation using static frequency converters for maintaining the relative synchronism and rotary speed of separate motors or motor groups, operating at unlike frequencies, in driving machines, and machine units for producing or processing threads or band and strand-shaped filamentary commodities made of cellulose derivatives or of thermoplastic synthetics.

Groups of machines and machine units, driven at unlike rates of speed, each having a fixed speed ratio with respect to the others, are employed in many branches of industry, particularly in factories producing plastics and textiles, where it is often of importance, in maintaining quality of product, that consecutive process steps take place always in a uniform rhythm, and that the relative synchronism of separately driven devices, which perform sequential functions in the process, be strictly maintained. This is not only true in the technological sequence of operations, in an individual processing sequence, but is even more important where several equivalent installations are operated in parallel, each next to another. Even small departures from desired rates of rotation and relative speeds, for example, in synthetic thread stretching and shrinking programs, may have a deleterious effect upon titer or denier fluctuations, during subsequent processing, such as dyeing.

An arbitrary speed ratio for the separate driving motors of an installation embodying several individually driven component devices, as well as for the motors of equivalent installations disposed in parallel, side by side relationship, can be maintained fairly constant, under given operating conditions, by energizing the several motors from supply sources of unlike frequency. In such cases, the individual motors are customarily fed from auxiliary supply systems powered by converters, which are energized from the main power supply network.

For the regulation and maintenance of the chosen frequencies, known arrangements employ control devices which compare the ideal and actual speeds of rotation of the controlled components, and either control speed ratios by means of gears units with servo-motors or by changing the energy supply to the converters or to the driving motors by means of electronic control circuitry. Such regulators, however, are somewhat sluggish in operation, are undesirably thermo-sensitive and are subject more or less to cummulative errors. In order to reduce overregulation, so-called return leads, or like operating adjustment devices are provided. Since the driven masses, that are accelerated or decelerated during the regulation process, have to be brought precisely to a desired rotary speed within the shortest possible time interval, powerful drive units are required at the converter or operating motor or large pilot units. All of these regulating arrangements assume a certain degree of aberrations in order to be able to function at all, and they are comparatively expensive. As a consequence, really exact regulation of rotary speed, where the difference between ideal and actual speed amounts to zero, is not possible, in speed control equipment and systems presently available. On the other hand, program changes required, for example, because of the stretching of threads, foils, filaments and the like, make it necessary to change the ratios of rotation speed, and, consequently, to re-regulate or adjust the controlling frequencies; and this is accomplished with corresponding expenditure of time and effort.

Digital regulators, which function as impulse counters, have also been proposed, with generally high power of analysis when comparing ideal and actual speed ratios. Such regulators permit precise and rapid electrical adjustments, but cannot effectively accomplish mechanical acceleration and deceleration of controlled motors due to their mass moment of inertia. As a consequence, it is necessary to sacrifice the precision of such regulators, in order to avoid control oscillations and an overriding of the number of revolutions.

Furthermore in the simultaneous operation of several adjacent A.C. motors lying side by side, in a series arrangement the relative rotary speed rate of which has to be kept constant, over an extended time period, it is a known procedure to employ a static frequency changer, which produces a D.C. voltage, by means of a rectifier, and to transform this direct voltage, by means of an inverter, into an alternating voltage of variable frequency. Such an arrangement permits changes in relative speed rate only to a limited extent, since the respective setting, changing and regulation of the frequencies or of the control impulses, for example, when the motors are started, is done manually and is therefor subject to the accidental or chance happenings connected with manual adjustment. Because of this, such control devices cannot be employed successfully for the relative speed regulation of motors or motor groups of the sort here contemplated.

An important object of the present invention is to provide an effective system for enforcing with maximum precision the relative synchronism of several drive motors or motor groups, driven at different frequencies, while minimizing total errors, without requiring special regulation devices for maintaining desired relative rates of rotary speed and frequency, while facilitating the changing of the program, at will.

Briefly stated, the present invention contemplates the application of a control impulse train to the D.C. voltage of a static frequency changer, in order to produce an alternating current of desired frequency for controlling the rate of rotation of a controlled motor, the control impulse train being changed, as and when the speed or rate of rotation of the controlled motor is to be changed. According to the invention, the regulation of the speed of rotation of controlled motors and the maintenance of a desired speed or synchronism of motors driven at different frequencies, is accomplished by applying control impulse successions or trains of the character required for the production of the different frequencies needed in a selected operating process. Such trains may be first applied, as recorded traces disposed side by side in a common impulse storer, which may comprise a band or tape or disk; and these traces may then be tapped off from the impulse storer operating at constant or controlled speed, by means of a suitable contact element or transducer, reproduced and applied into the D.C. voltage of the static frequency changer, so that the frequency changer, at its output side, delivers alternating current energy at the desired frequency and voltage for the control of the rate of rotation of the alternating current motor or motors connected with it.

If desired, the common impulse storer may be constructed as a perforated band or disk, as a finite or endless record tape, or even as the control disk of an impulse generator. Preferably the impulse storer comprises recording tape, traces of which produced in conventional fashion by mechanical, electrical, acousto-electric or electro-magnetic methods. The various control impulse successions can be programmed over a period of time, in synchronized manner; but, if desired, it is also possible to program individual control impuse successions, for example, for controlling the rotary speed of spindles or the kinematics of ring rails, in a variable manner over a time interval. The tapping off and reproducing, as well as the passing on, of the control impulse successions applied upon the impulse storer can be done by well known contact elements or transducers, such as electrical or electro-magnetic tracer heads or sound film heads, selenium cells, impulse generators or the like. It is only necessary that a corresponding contact element or transducer be provided, in the tracer or sound head or generator, for each control impulse succession or trace. It is also possible to take off the control impulse succession of an individual trace or of several traces, from the impulse storage, through branch channels, or through impulse succession dividers or multipliers, to an appropriate number of frequency changers. Besides the actual control program for the rotary speed rates, one or several further record traces of control impulse successions may be additionally applied into the impulse store, for regulating the program according to the process involved, by automatically turning on or off or changing the regulation measures. These additional record traces may be applied and tapped off, from the impulse storage, by means of special contact elements or transducers, and passed on to the appropriate circuit elements.

The rotary speed control program, as well as the switching program, may relate to an individual spinning unit, or to groups or series of parallel individual spinning units, or to devices consisting of several similar machines. For larger installations, consisting of many similar machines, two impulse control systems may be employed, of which one may be supplied from a heavy duty power source, the other being supplied from a power source of considerably less capacity, in which case the components controlled by an individual operating unit will be connected to the latter only when needed. Such a situation may occur, for example, where interference or blockage of the components, controlled by a particular operating unit, occurs. In such circumstance, the driving means of the individual component or components may be connected to the auxiliary impulse control system, while it delivers the same frequencies as the main system; and the individual component can then be stopped by means of appropriate control impulse successions or speed control, without affecting the remaining individual components connected in the system. After elimination of the interference, the individual component may be accelerated, by means of the auxiliary system, up to the rotary speed at which the remaining individual components and machines are running, and then may again be connected to the main power supply system.

In further elaboration of the invention, an installation for the execution of the described regulatory measures may be provided where a static frequency changer is assigned to each driving motor or motor group. For the operation of the impulse storage means, a driving installation, including an electric or photo-electric or electromagnetic contact head or sound head or an impulse generator, may be provided which possess a number of contact elements or transducers, at least corresponding to the number of control impulse succession traces recorded in the impulse storage device. The running or rotation of the impulse storage means may take place at constant or controlled variable speed. In some cases, it may be desirable to employ an impulse storage device comprising several disks, each carrying a desired number of control impulse successions or impulse markings. These disks may rotate at the same speed or at different speeds. In the latter case the disks coupled in formlocking manner, on the driving side, may rotate at reduced speed or mechanical "step-up." To vary the control impulse successions, individual impulse trains or several trains may be provided, between the tapping elements or transducers of the sound head, on the one hand, and the static frequency changers, on the other hand, can be transferred by way of impulse dividers or impulse multipliers. In certain situations, as for example, to avoid mirror formations, in thread winding, it may be desirable to vary the rate of rotary speed of the winding device for short and irregular times. In order to guarantee such a variation in the speed rate, one of the contact elements or transducers, the contact heads or sound heads or impulse generators or the receivers of the static frequency changer, may be arranged to receive the respective impulse succession, in such a manner that it is movable by displacement. Accordingly, a second motion may be superposed upon the movement of the store or of the impulse succession speed which results in the desired effect.

Through the different measures proposed, regulation of multiple motor drives is accomplished by means of a common control impulse center for the production of various preselected frequencies, which safely guarantees the relative synchronism of the several controlled motors or motor groups driven at these frequencies, while maintaining a fixed ratio of rotary speed, the control sequence being repeatable always with the same precision and safety, without necessitating special regulation devices for controlling rotary speed or the control impulse frequencies. The common impulse store for the various control frequencies can very simply be exchanged for an impulse store on which other control impulse frequency successions, such as changed rates of rotary speed, are programmed. Consequently, processing machines and machine units can be conditioned immediately for the performance of different tasks, without the delay of otherwise customary installation and resetting times.

The teachings of the invention may be employed to great advantage in the chemical textile industry, for the production and processing of endless threads or band or strand-shaped filamentary material from thermoplastic substances, in machines and machine units in which a series of different motional actions is required, at different rates of rotary speed, and/or in several cohesive process stages; and, where the several component devices are required to operate in sequence, in accordance with a predetermined synchronous rhythm, thus requiring precisely determined speed ratios of the several driving motors or motor groups, as, for example, in draw-twisters or draw-winding machines, and in spinning draw-twisters and the like.

The foregoing and numerous other important objects, advantages, and inherent functions of the invention will become apparent as the same is more fully understood from the following description, which, taken in conjunction with the accompanying drawings discloses a preferred embodiment of the invention.

Referring to the drawings:

FIG. 1 is a diagrammatic showing of a motor speed control system for regulating the operation of several motors, at differing rates of speed, but having constant relative speed rates in relation to each other, as in a draw-winding machine;

FIG. 2 is a diagrammatic illustration of a modified system; and

FIG. 3 is an enlarged perspective view of a component of the control apparatus.

To illustrate the invention, the drawings show driving motors 1, 2, 3 and 4 which may comprise synchronous or asynchronous motors, to each of which a static frequency changer 5, 6, 7 and 8 is assigned. The motors can be set up as a collective drive for a series of installations of the machine to be driven; but each device of a series may also just as well be driven by an individual motor; and the motor groups of a series may be connected to the static frequency changers. One or several thread supply mechanisms 9 may be driven by motor 1, thread moving galettes 10 may be driven by motor 2, additional galettes 11 may be driven by motor 3 and the friction rollers 12 of the thread winding device may be driven by motor 4. The description is limited to these four main drives which could be arbitrarily expanded in practice.

The estatic frequency changers 5, 6, 7 and 8 are energized from one or several alternating current supply lines 13 or 14. Static frequency changers, as is well known, first of all function, by means of a rectifier, to convert the A.C. energy, supplied from the lines 13, 14 into direct current energy, which is then stabilized and stored in capacitors. By means of a second rectifier, the thyratrons of which are ignited and quenched in the rhythm of control impulses fed into the changers, the direct current is changed into alternating voltage at the frequency of the impulse succession and fed to the driving motors.

The impulse successions required for the formation of desired frequency and rate of rotary motor speed, are fed to the static frequency changers through the channel 15, 16, 17 and 18, by contact elements or transducers which are preferably combined in a sound head 19. This head functions to scan the running record tape 20. On the recording tape 20, which serves as an impulse storage device, the several control impulse successions for the production of the required frequencies are applied as traces running side by side.

Thread, for example, may be required to be delivered at speeds of the order of 600 meters per minute. Where the feed rollers 9 have a diameter of 75 millimeters of the feed rollers 9, a speed of twenty five hundred and fifty rotations per minute are required. Consequently, the motor 1, or its motor group, has to be energized at a frequency of 85 cycles per second in the case of 4-polar construction. The next motor 2, or its motor group, drives the stretching galettes 10 of one hundred millimeters diameter, and, in the case of a 4-polar construction has to be driven at a frequency of 213 cycles per second, for a predetermined amount of thread stretching, and consequently of a thread conveying speed of, for example, two thousand meters per minute, i.e. sixty-three-hundred and ninety revolutions per minute. Motor 3 or its motor group, drives the thread conveying galettes 11 of one hundred millimeters diameter with a predetermined, for example 5% slower speed, in order to permit shrinkage of the thread required by the process, and so has to be driven at a frequency of the order of 203 cycles per second. Finally, motor 4, or its motor group, drives the frcition rollers 12 of the winding device of one hundred millimeters diameter at further reduced speed, for example, 1.5% slower, in order to allow the thread to shrink even more and/or to run onto the roller with minimal thread tension. This motor 4, or its motor group, consequently requires a feeding frequency of 200 cycles per second. If desired, the friction rollers 12 may be constructed as slot drums and simultaneously serve for thread stringing, The impulse storage means 20, which preferably comprises recording tape, supplies the control impulses required for the regulation of the static frequency changers 5, 6, 7 and 8. In the case of a secondary frequency of 85, 213, 203 and 200 cycles per second expediently a threefold or higher pulse frequency is required. A multiple amount of the pulse frequency is recommended because, with simple binary reducers adjustment to the desired frequency is easily accomplished.

This is shown in FIG. 2. Here the apparatus 20 delivers, from an endless tape, three different control impulse successions on the channels 21, 22, 23 of which the impulse successions of the channels 21 and 22 are respectively led over branch channels 24 and 25 or 26 and 27 and reduced into a desired impulse succession by binary reducers or impulse dividers 28, 29, 30 and 31 and passed on as desired impulse successions to the static frequency changers 5, 6, 7 and 8. The impulses delivered, to the switch gear 32, through the channel 23, serve only to perform the switching required by the process, such as the stopping of the machine, controlling the length of the pauses and the like.

FIG. 3 shows the arrangement of three impulse echo boxes 33, 34 and 35, in a soundfilm head, which respectively each scan one of the control impulse traces on the record tape 36 and pass corresponding signals along via channels 37, 38 and 39. Upon the control impulse successions to be produced by the scanner 35, an oscillating movement may be superimposed. Such movement may be produced, for example, by means of an adjustable crank 40, which moves the impulse scanner 35 and gives it a surging to-and-fro motion in the direction of movement of the recording tape. Control impulse successions subject to such surging action may be advantageously employed for the driving of winding devices or of their thread stringing traverse motion apparatus for the purpose of influencing interference.

It is thought that the invention and its numerous attendant advantages will be fully understood from the foregoing description, and it is obvious that numerous changes may be made in the form, construction and arrangements of the several parts without departing from the spirit or scope of the invention, or sacrificing any of its attendant advantages, the forms herein disclosed being preferred embodiments for the purpose of illustrating the invention.

The invention is hereby claimed as follows:

1. Apparatus for controlling the turning speed of an alternating current motor comprising, in combination:
   an alternating current motor;
   frequency changing means having a power input, a control input and a power output, said power output being connected to said motor;
   a source of alternating current energy connected to the power input of said frequency changing means; and
   an impulse generating means, mechanically independent of said alternating current motor, having a programmable carrier means for storing a control impulse sequence, a sensing means operatively associated with said carrier means for retrieving said control impulse sequence from said carrier means, and means for communicating said control impulse sequence from said sensing means to the control input of said frequency changing means whereby the control impulse sequence may be utilized to control the speed of said alternating current motor.

2. Apparatus for synchronizing the turning speeds of alternating courrent motors and motor groups comprising, in combination:
   a plurality of alternating current motors;
   a plurality of frequency changing means each having a power input, a control input and a power output, said power output being connected to at least one of said motors;

a source of alternating current energy connected to the power inputs of said frequency changing means; and an impulse generating means having a carrier means for storing a plurality of control impulse sequences, a plurality of sensing means operatively associated with said carrier means for selectively retrieving said control impulse sequences from said carrier means, and a plurality of output means for communicating said control impulse sequences from said sensing means to the control inputs of said frequency changing means.

3. Apparatus in accordance with claim 2 including, in addition:

switching means for controlling auxiliary sequencing operations;

additional carrier means for storing auxiliary control impulse sequences;

additional sensing means operatively associated with said additional carrier means for retrieving said auxiliary control impulse programs from said additional carrier means; and output means for communicating said auxiliary control impulse programs from said additional sensing means to said switching means.

4. Apparatus for synchronizing the turning speeds of alternating current motors and motor groups comprising, in combination:

a plurality of alternating current motors;

a plurality of frequency changing means each having a power input, a control input and a power output, said power output being connected to at least one of said motors;

a source of alternating current energy connected to the power inputs of said frequency changing means;

an impulse generating means having a carrier means for storing a plurality of control impulse sequences, a plurality of sensing means operatively associated with said carrier means for selectively retrieving said control impulse sequences from said carrier means, and a plurality of first conducting channels, each of said first conducting channels being connected to one of said sensing means;

a plurality of branch conducting channels arranged between said first conducting channels and the control inputs of said frequency changing means whereby many of said frequency changing means can be supplied with control impulse sequences from relatively few of said sensing means; and binary reducing means operatively arranged in at least one of said branch conducting channels whereby the frequency of said control impulse sequences may be modified.

5. Apparatus in accordance with claim 2 wherein said impulse generating means includes, in addition:

a rotatably mounted crank means;

motor means operatively connected to said crank means for rotating said crank means; and means for connecting said crank means to said sensing means whereby said sensing means is moved in an oscillating manner parallel to the direction of movement of said carrier means thereby causing the spacing of impulses in said control impulse sequence to be continually varied.

6. Apparatus for controlling the turning speed of an alternating current motor comprising, in combination:

an alternating current motor;

frequency changing means having a power input, a control input and a power output, said power output being connected to said motor;

a source of alternating current energy connected to the power input of said frequency changing means;

an impulse generating means, mechanically independent of said alternating current motor, having a programmable carrier means for storing a control impulse sequence, a sensing means operatively associated with said carrier means for retrieving said control impulse sequence from said carrier means, means for communicating said control impulse sequence from said sensing means to the control input of said frequency changing means whereby the control impulse sequence may be utilized to control the speed of said alternating current motor;

a rotatably mounted crank means;

motor means operatively connected to said crank means for rotating said crank means; and means for connecting said crank means to said sensing means whereby said sensing means is moved in an oscillating manner parallel to the direction of movement of said carrier means thereby causing the spacing of impulses in said control impulse sequence to be continually varied.

References Cited

UNITED STATES PATENTS

| 2,939,062 | 5/1960 | Justus | 318—231 XR |
| 2,940,029 | 6/1960 | Wiedemann | 318—231 |
| 3,105,927 | 10/1963 | Flatten et al. | 318—20 |
| 3,164,909 | 1/1965 | Rosenberg | 318—20 |
| 3,178,624 | 4/1965 | Borden | 318—231 |
| 3,206,664 | 9/1965 | Lilly | 318—231 XR |
| 3,344,326 | 9/1967 | Risberg | 318—231 XR |
| 3,399,334 | 8/1968 | MacLeod | 318—329 |

ORIS L. RADAR, Primary Examiner

G. RUBINSON, Assistant Examiner

U.S. Cl. X.R.

318—231